(12) United States Patent
Yabushita

(10) Patent No.: US 6,570,836 B2
(45) Date of Patent: May 27, 2003

(54) DISK CLAMPING MECHANISM

(75) Inventor: Keiichi Yabushita, Ueda (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 0 days.

(21) Appl. No.: 09/789,474

(22) Filed: Feb. 22, 2001

(65) Prior Publication Data

US 2001/0015951 A1 Aug. 23, 2001

(30) Foreign Application Priority Data

Feb. 22, 2000 (JP) ........................................ 2000-044526

(51) Int. Cl.7 .............................................. G11B 23/00
(52) U.S. Cl. ....................................................... 369/270
(58) Field of Search .................................. 369/270, 271, 369/282, 75.2; 360/99.08, 99.12

(56) References Cited

U.S. PATENT DOCUMENTS 5,719,849 A * 2/1998 Hiraga ......................... 369/271
6,108,294 A * 8/2000 Iwanaga ....................... 369/270

* cited by examiner

Primary Examiner—Allen Cao
(74) Attorney, Agent, or Firm—Birch, Stewart, Kolasch & Birch, LLP

(57) ABSTRACT

In the disk clamping mechanism of the present invention, a turntable has a columnar section capable of fitting a disk-shaped medium and a circular supporting section capable of supporting the disk-shaped medium. A damper has a circular pressing section and is magnetically drawn toward the turntable so as to hold the disk-shaped medium. A circular hole is formed in the columnar section of the turntable. A positioning boss is provided in the bottom face of the clamper and inserted into the circular hole. An outer circumferential face of the positioning boss is formed into a tapered face. The tapered face contacts an inner edge of the circular hole when the clamper is held on the turntable on which no disk-shaped medium is mounted. The insertion of the positioning boss into the circular hole is stopped when a distance between the pressing section of the clamper and a supporting section of the turntable is shorter than thickness of the disk-shaped medium.

4 Claims, 7 Drawing Sheets

DISK CLAMPING MECHANISM

BACKGROUND OF THE INVENTION

The present invention relates to a disk clamping mechanism, more precisely relates to a disk clamping mechanism for a disk drive unit, which drives a disk-shaped memory medium, e.g., a CD-ROM, a CD-R, a CD-RW, a DVD-ROM.

A conventional disk clamping mechanism of a disk player will be explained with reference to FIGS. 4 and 5.

The disk clamping mechanism 10 includes: a turntable 12 on which a disk-shaped medium (not shown), e.g., a compact disk, will be mounted; and a clamper 14, which is magnetically drawn toward and held on the turntable 12 so as to clamp the disk-shaped medium between the turntable 12 and the clamper 14.

The turntable 12 is formed into a disk shape. A columnar section 16 is provided to a center of an upper face of the turntable 12. The columnar section 16 will be fitted into a center hole of the disk-shaped medium so as to coincide an axial line of the disk-shaped medium with that of the turntable 12. A circular supporting section 18, which is capable of supporting a bottom face of the disk-shaped medium, is formed in the upper face and along an outer edge of the turntable 12. The turntable 12 is usually directly connected to an output shaft (not shown) of a spindle motor 20. The spindle motor 20 rotates the turntable 12.

A circular hole 22 is bored in an upper end face of the columnar section 16. The circular hole 22 is coaxial with the columnar section 16 and the turntable 12. A ring magnet 24 is fixed in the upper end face of the columnar section 12 and encloses the circular hole 22. Tongue pieces 26 are provided in an outer circumferential face of the columnar section 16 with regular angular separation's. The tongue pieces 26 are capable of engaging with the center hole of the disk-shaped medium when the disk-shaped medium is inserted into the disk drive unit 40 (see FIGS. 6 and 7). Therefore, the disk-shaped medium can be clamped without play.

The supporting section 18 is usually made of a rubber ring so as to increase frictional force between the supporting section 18 and a bottom face of the disk-shaped medium, so that the disk-shaped medium can be securely clamped.

The damper 14 is formed into a circular disk. The clamper 14 has a circular pressing section 28, which is formed in a bottom face and along an outer edge of the clamper 14. The clamper 14 is magnetically drawn toward the upper face of the turntable 12 so as to clamp the disk-shaped medium between the supporting section 18 of the turntable 12 and the pressing section 28 of the clamper 14. Namely, the disk-shaped medium will be held in a space "A".

A planar ring 30, which is made of a magnetizable metal, is provided and exposed in the bottom face of the clamper 14. The planar ring 30 is coaxial with the axial line of the clamper 14. The planar ring 30 is fixed in a circular groove 32, which is formed in a center part of the bottom face of the clamper 14.

A positioning boss 34 is formed into a columnar shape and projected downward from the center of the bottom face of the clamper 14. The positioning boss 34 is coaxial with the clamper 14. The planar ring 30 encloses the positioning boss 34. The positioning boss 34 can be inserted into the circular hole 22 when the clamper 14 is magnetically drawn toward the turntable 12, so that the axial line of the clamper 14 can be coincided with that of the turntable 12. Outer diameter of the positioning boss 34 is nearly equal to inner diameter of the circular hole 22 so as to smoothly go into and out from the circular hole 22.

In FIG. 4, the spindle motor 20 is attached to a circuit board 36, to which stator coils (not shown) of the spindle motor 20 are electrically connected. Rotation detecting elements, e.g., haul elements, are provided to the circuit board so as to detect rotational speed of a rotor of the spindle motor 20. Cables 38, which are capable of supplying electric power to the spindle motor 20 and sending signals of the rotation detecting elements, etc. outside, are electrically connected to the circuit board 36.

As shown in FIGS. 6 and 7, in the disk clamping mechanism having the turntable 12 and the clamper 14, a clamper holding plate 44 is usually fixed to an upper part of a casing 42 of the disk drive unit 40. The clamper 14 is rotatably attached to the clamper holding plate 44 and is capable of slightly moving up and down with respect to the clamper holding plate 44.

A tilt table 46 is provided under the damper holding plate 44. The turntable 12, the spindle motor 20 and the circuit board 36 are fixed to the tilt table 46.

The tilt table 46 is tilted downward and upward when a disk tray, which conveys the disk-shaped medium to a position corresponding to an optical pickup of the disk drive unit 40, is set into and taken out from the disk drive unit 40. Namely, the tilt table 46 is tilted down when the disk tray is taken out from the disk drive unit 40; the tilt table 46 is tilted up after the disk tray is set in the disk drive unit 40.

When the tilt table 46 is tilted up, the turntable 12, which is attached to the tilt table 46, is moved close to the clamper 14. Then, the clamper 14 is magnetically drawn toward and held on the turntable 12. After that, the tilt table 46 is further slightly tilted up and stopped. With this action, the turntable 12 holds the clamper 14. In this state, the clamper 14 is slightly floated from the clamper holding plate 44 and capable of freely rotating with respect to the clamper holding plate 44. If the disk-shaped medium is mounted on the disk tray when the tilt table 45 is tilted up, the disk-shaped medium is firstly mounted onto the turntable 12, then the disk-shaped medium, which has been supported by the turntable 12, is moved close to the clamper 14, so that the disk-shaped medium is clamped between the turntable 12 and the clamper 14, which is magnetically drawn toward the turntable 12. With this action, the disk-shaped medium can be rotatable held on the turntable 12.

On the other hand, when the tilt table 46 is tilted down, the clamper 14, which has been magnetically held by the turntable 12, is moved away therefrom, against the magnetic force of the ring magnet 24, by moving the turntable 12 away from the clamper holding plate 44.

As described above, even if the disk-shaped medium is not mounted on the disk tray, the clamper 14 is moved close to and away from the turntable 12 when the disk tray is set into and taken out from the disk drive unit 40.

In the conventional disk clamping mechanism 10 having the turntable 12 and the lamper 14, a distance between a surface of the ring magnet 24 of the turntable 12 and a surface of the planar ring 30 of the clamper 14 is quite different in a first state, in which the disk-shaped medium is mounted on the turntable 12, and a second state, in which no disk-shaped medium is mounted on the turntable 12. The reason is that outer diameter of the positioning boss 34, which is formed at the center of the bottom face of the clamper 14, is wholly shorter than inner diameter of the circular hole 22, which is bored in the upper face of the columnar section 16 of the turntable 12, a base section of the positioning boss 34 is fully inserted into the circular hole 22 when the clamper 14 is magnetically held by the turntable 12, and the upper end of the columnar section 16, in which the ring magnet 24 is provided, nearly contacts the bottom face of the planar ring 30.

In the case that the no disk-shaped medium is clamped between the turntable 12 and the clamper 14 and the distance "B" (see FIG. 5) between the surface of the ring magnet 24 of the turntable 12 and the surface of the planar ring 30 of the clamper 14 is very short, greater force is required to move the clamper 14 away from the turntable 12 because magnetic force is in inverse proportion to square of the distance. When the greater force is applied to move the clamper 14 away from the turntable 12, greater stress is applied to the tilt table 46, to which the turntable 12 is provided, a mechanism for driving the tilt table 46, which includes gears and cums, etc., so that the disk clamping mechanism 10 is apt to be damaged.

SUMMARY OF THE INVENTION

An object of the present invention is to provide a disk clamping mechanism, in which a clamper can be moved away from a turntable, in the second state, with smaller force, which is nearly equal to required force in the first state.

To achieve the object the disk clamping mechanism of the present invention has following structures.

Namely, the first basic structure of the disk clamping mechanism comprises:

a turntable being formed into a circular disk, the turntable having a columnar section, which is coaxially provided to a center of an upper face of the turntable and which is capable of fitting into a center hole of a disk-shaped medium mounted on the turntable so as to coincide an axial line of the disk-shaped medium with an axial line of the turntable, and a circular supporting section, which is capable of supporting a bottom face of the disk-shaped medium and which is formed in the upper face and along an outer edge of the turntable;

a clamper being formed into a circular disk, the clamper having a circular pressing section, which is formed in a bottom face and along an outer edge of the clamper, the clamper being magnetically drawn toward the upper face of the turntable so as to hold the disk-shaped medium between the supporting section of the turntable and the pressing section of the clamper;

a circular hole being formed at a center of an upper end face of the columnar section of the turntable; and a positioning boss being formed into a columnar shape and provided to a center of the bottom face of the clamper, the positioning boss being inserted into the circular hole so as to coincide an axial line of the clamper with the axial line of the turntable, wherein an outer circumferential face of the positioning boss is formed into a tapered face whose outer diameter is gradually made greater toward a base end thereof, and the tapered face of the positioning boss contacts an inner edge of the circular hole when the camper is magnetically held on the turntable on which no disk-shaped medium is mounted, and the insertion of the positioning boss into the circular hole is stopped when a distance between the pressing section of the clamper and a supporting section of the turntable is shorter than thickness of the disk-shaped medium.

The second basic structure of the disk clamping mechanism comprises:

a turntable being formed into a circular disk, the turntable having a columnar section, which is coaxially provided to a center of an upper face of the turntable and which is capable of fitting into a center hole of a disk-shaped medium mounted on the turntable so as to coincide an axial line of the disk-shaped medium with an axial line of the turntable, and a circular supporting section, which is capable of supporting a bottom face of the disk-shaped medium and which is formed in the upper face and along an outer edge of the turntable;

a clamper being formed into a circular disk, the clamper having a circular pressing section, which is formed in a bottom face and along an outer edge of the clamper, the clamper being magnetically drawn toward the upper face of the turntable so as to hold the disk-shaped medium between the supporting section of the turntable and the pressing section of the clamper;

a positioning boss being formed into a columnar shape and provided to a center of an upper end face of the columnar section of the turntable; and a circular hole being formed at a center of the bottom face of the clamper, wherein the positioning boss is inserted into the circular hole so as to coincide an axial line of the clamper with the axial line of the turntable, wherein an outer circumferential face of the positioning boss is formed into a tapered face whose outer diameter is gradually made greater toward a base end thereof, and the tapered face of the positioning boss contacts an inner edge of the circular hole when the champer is magnetically held on the turntable on which no disk-shaped medium is mounted, and the insertion of the positioning boss into the circular hole is stopped when a distance between the pressing section of the clamper and a supporting section of the turntable is shorter than thickness of the disk-shaped medium.

With the first and the second basic structures, in the state of clamping no disk-shaped medium, the tapered face of the positioning boss contacts the inner edge of the circular hole when the clamper is magnetically held on the turntable, so that the insertion of the positioning boss into the circular hole is stopped. Therefore, the clamper can be properly separated away form the turntable by adjusting the position of the tapered face and the angle thereof. Even if no disk-shaped medium is clamped, a proper clearance can be formed between the clamper and the turntable, so that the clamper can be moved away from the turntable with smaller force. By moving the clmaper with the smaller force, stress working to the disk clamping mechanism can be reduced, so that damage and trouble of the disk clamping mechanism can be prevented.

Note that, the tapered face may be formed in a base end part of the positioning boss.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Figure 1:
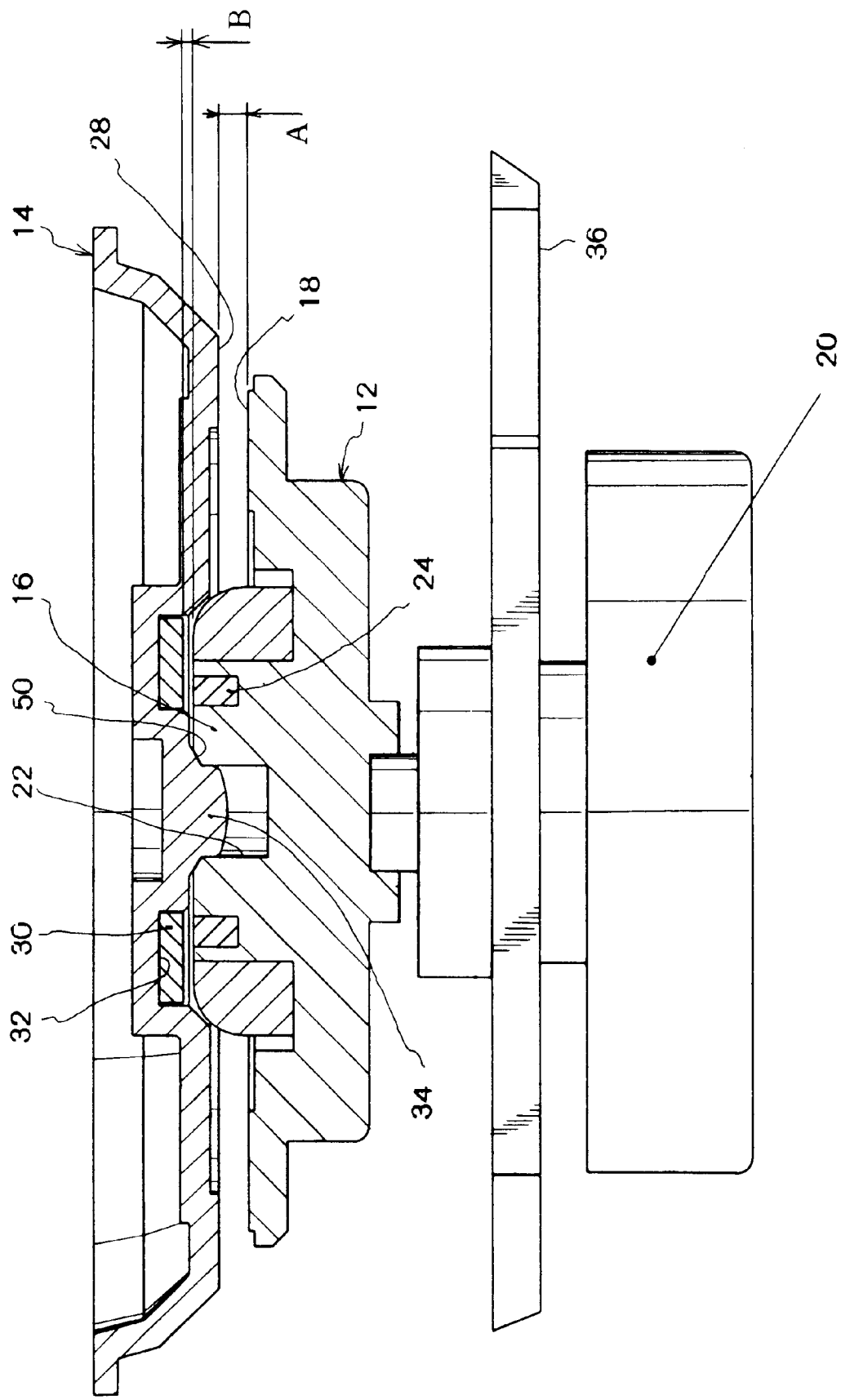
FIG. 1 is a sectional view of an embodiment of the disk clamping mechanism of the present invention.

Preferred embodiments of the present invention will now be described in detail with reference to the accompanying drawings. Note that, structural elements explained in BACKGROUND OF TECHNOLOGY are assigned the same symbols and explanation will be omitted.

Firstly, an embodiment will be explained with reference to FIGS. 1 and 2. The feature of the present embodiment is an outer circumferential face 50 of the positioning boss 34. It is formed into a tapered face whose outer diameter is gradually made greater toward a base end of the positioning boss 34.

In the present embodiment, for example, a front end part of the positioning boss 34 is formed into a columnar shape having fixed outer diameter; a base end part of the positioning boss 34 is formed into the tapered face 50. Note that, the positioning boss 34 may be formed into a cone shape, and the whole outer circumferential face of the cone-shaped positioning boss 34 may act as the tapered face 50.

In the case that no disk-shaped medium is mounted on the turntable 12, the columnar front end part and a part of the tapered base end part of the positioning boss 34 are inserted into the circular hole 22 when the clamper 14 is magnetically drawn toward the turntable 12. Since the maximum outer diameter of the tapered face 50 is greater than inner diameter of the circular hole 22, the tapered face 50 contacts an inner edge of the circular hole 22 before the positioning boss 34 is fully inserted into the circular hole 22, so that the insertion of the positioning boss 34 into the circular hole 22 is stopped.

Figure 2:
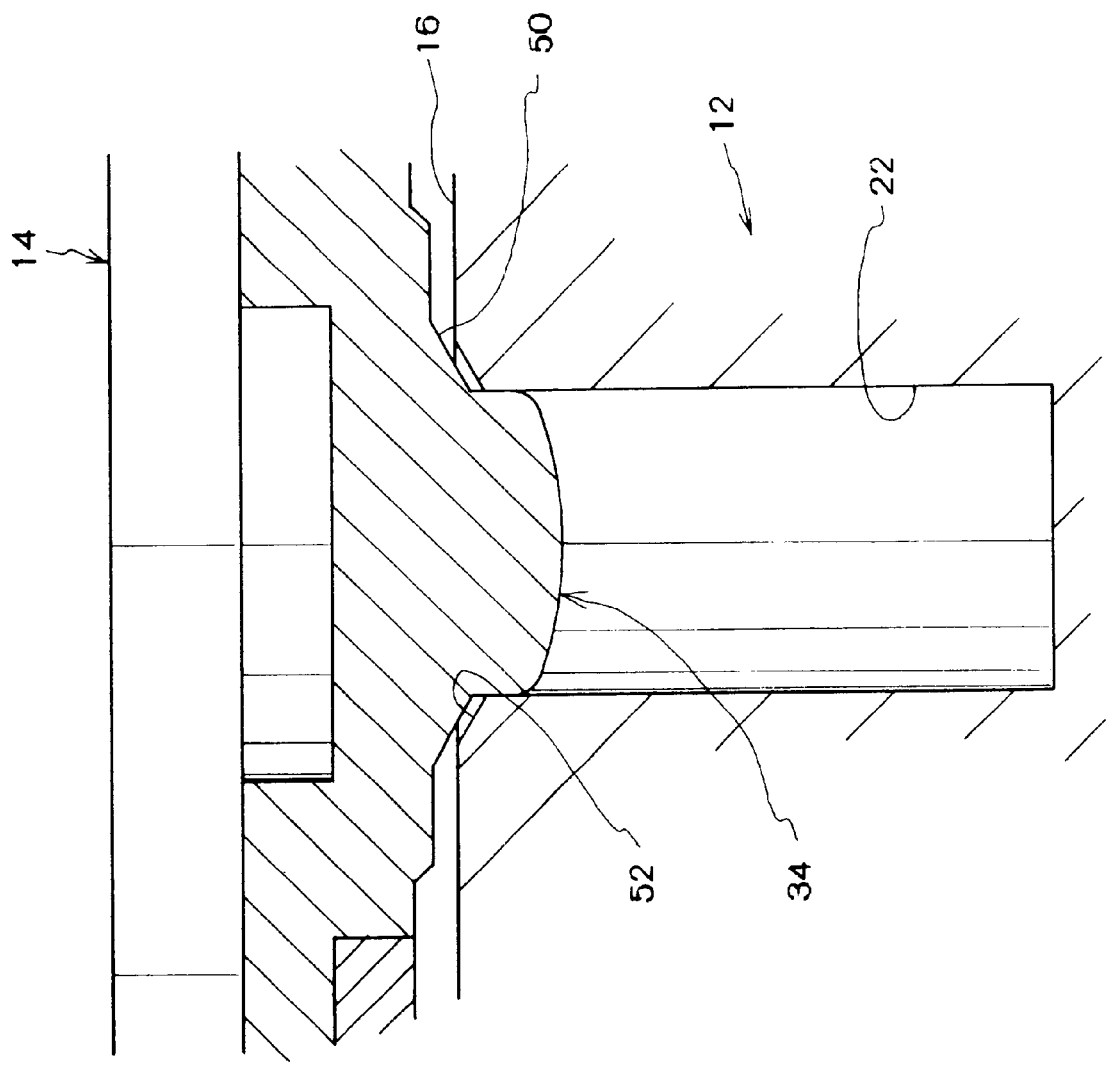
FIG. 2 is an enlarged view of a positioning boss, etc. shown in FIG. 1.

In the case of clamping no disk-shaped medium too, when the clamper 14 is magnetically held by the turntable 12, the distance "B" (see FIG. 1) between the upper face of the ring magnet 24 of the turntable 12 and the bottom face of the planar ring 30 of the camper 14 is nearly equal to said distance in the case of clamping the disk-shaped medium in the space "A" (see FIG. 1). The distance "B" can be controlled by adjusting a position and an angle of the tapered section 50 of the positioning boss 34.

By forming the clearance or distance "B", even if no disk-shaped medium is clamped, the clamper 14 can be moved away from the turntable 12 with smaller force, which is nearly equal to required force in the state of clamping the disk-shaped medium.

Figure 6:
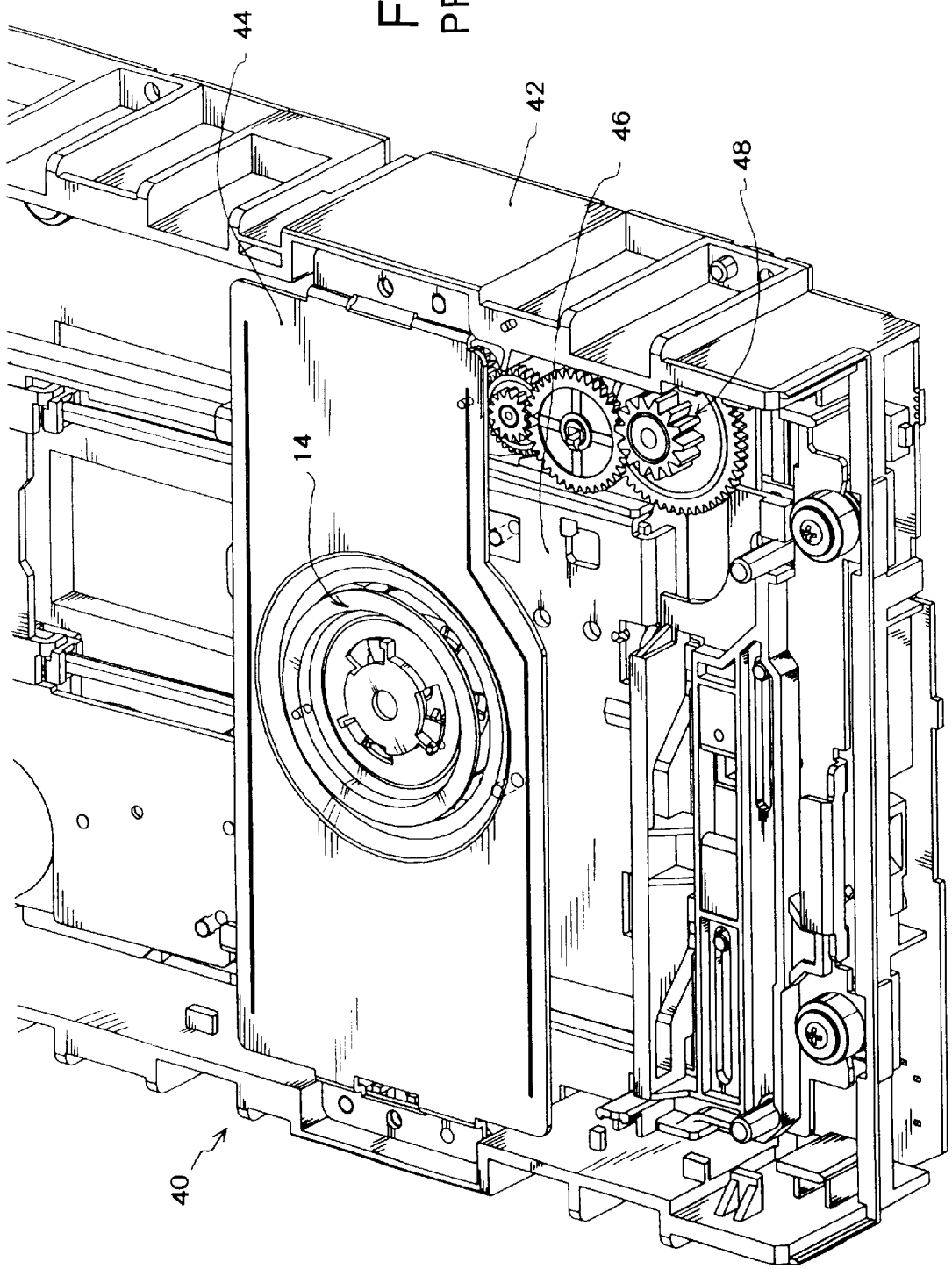
FIG. 6 is a perspective view of a disk player including the conventional disk clamping mechanism shown in FIGS. 4 and 5.
Figure 7:
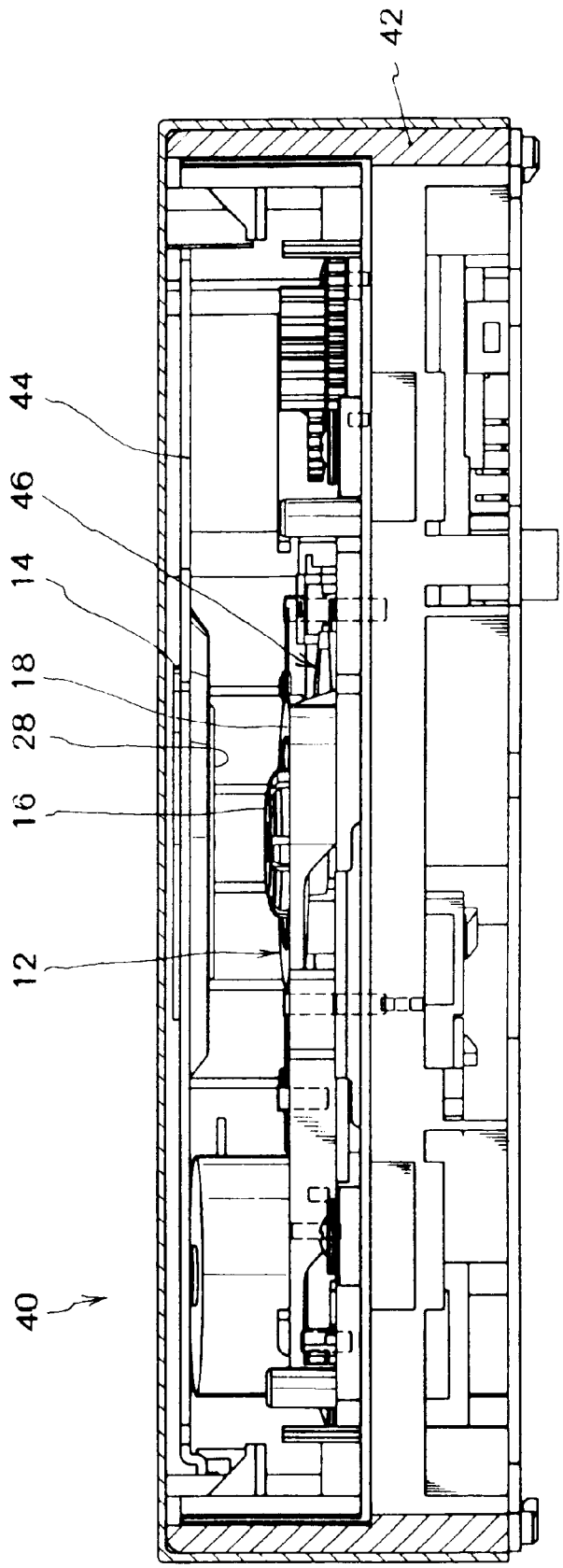
FIG. 7 is a front view of the disk player shown in FIG. 6.

Amount of inserting the positioning boss 34 into the circular hole. 22 is controlled by adjusting a contact point of the tapered face 50, which contacts the inner edge of the circular hole 22, so as to control the distance "B". As clearly shown in FIG. 6, the inner edge 52 of the circular hole 22 is formed into a female-tapered face, which is capable of fitting to the tapered face 50 of the positioning boss 34. Namely, the angle of the female-tapered face 52 is equal to that of the tapered face 50. With this structure, the axial line of the clamper 14 can be securely coincided with the axial line of the turntable 12 when the tapered face 50 contacts the female-tapered face 52.

The insertion of the positioning boss 34 into the circular hole 22 is stopped when a distance between the pressing section 28 of the clamper 14 and the supporting section 18 of the turntable 12 is slightly shorter than thickness of the disk-shaped medium. With this action, the disk-shaped medium can be securely clamped between the pressing section 28 of the clamper 14 and the supporting section 18 of the turntable 12. As described above, the contact point can be controlled by adjusting the position and the angle of the tapered face 50.

Another embodiment will be explained with reference to FIG. 3.

Figure 3:
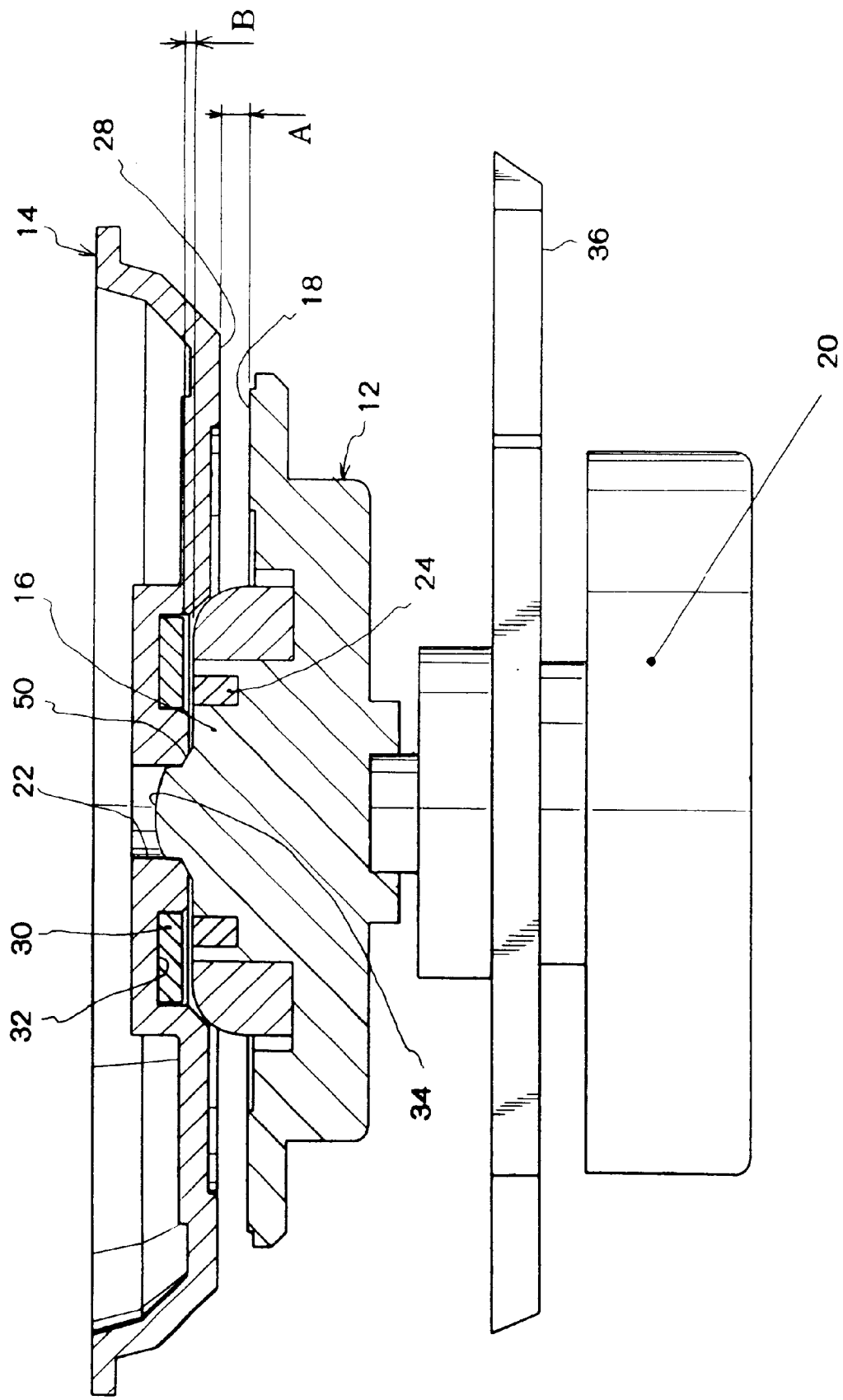
FIG. 3 is a sectional view of another embodiment of the disk clamping mechanism of the present invention.
Figure 4:
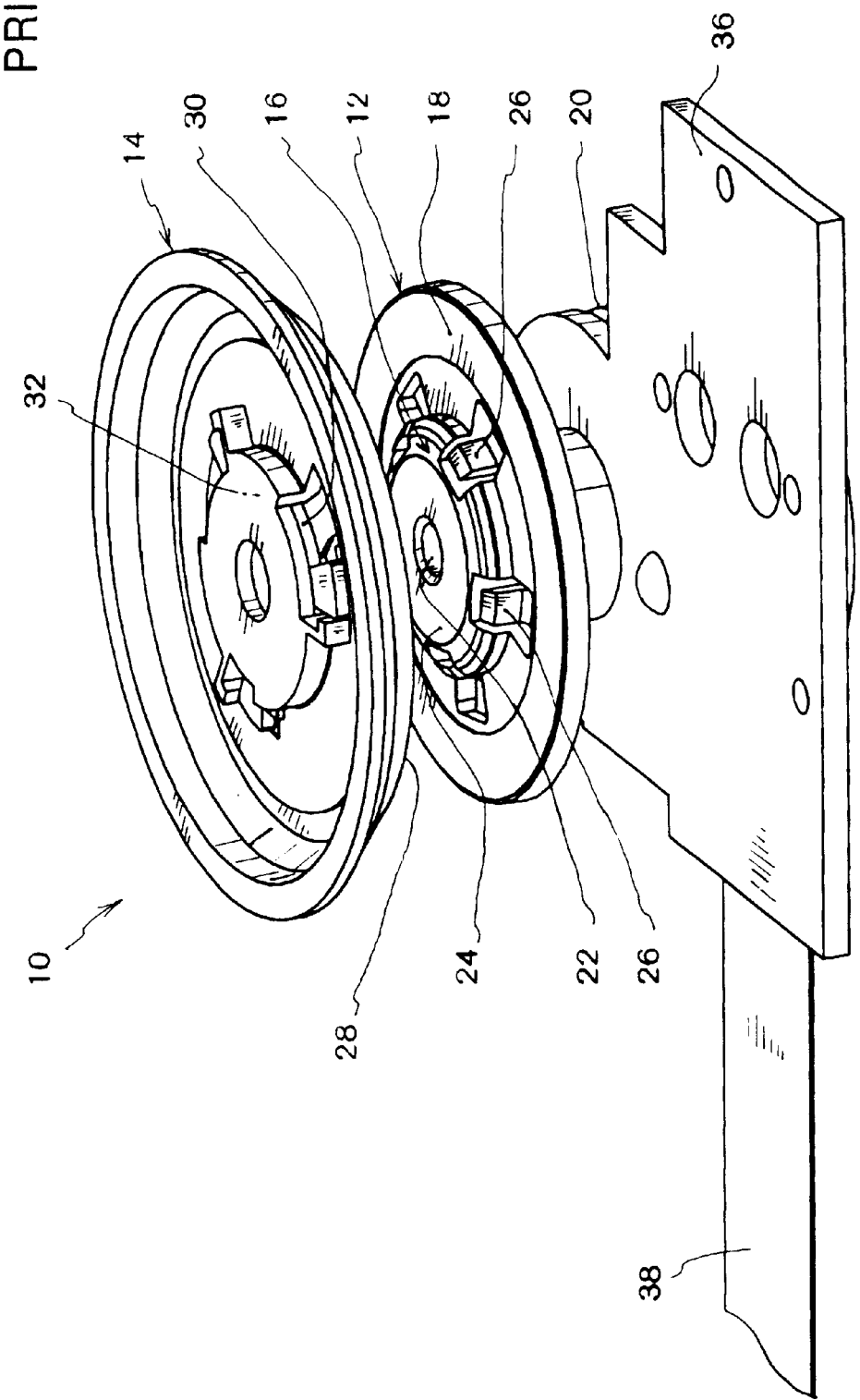
FIG. 4 is a perspective view of the conventional disk clamping mechanism.
Figure 5:
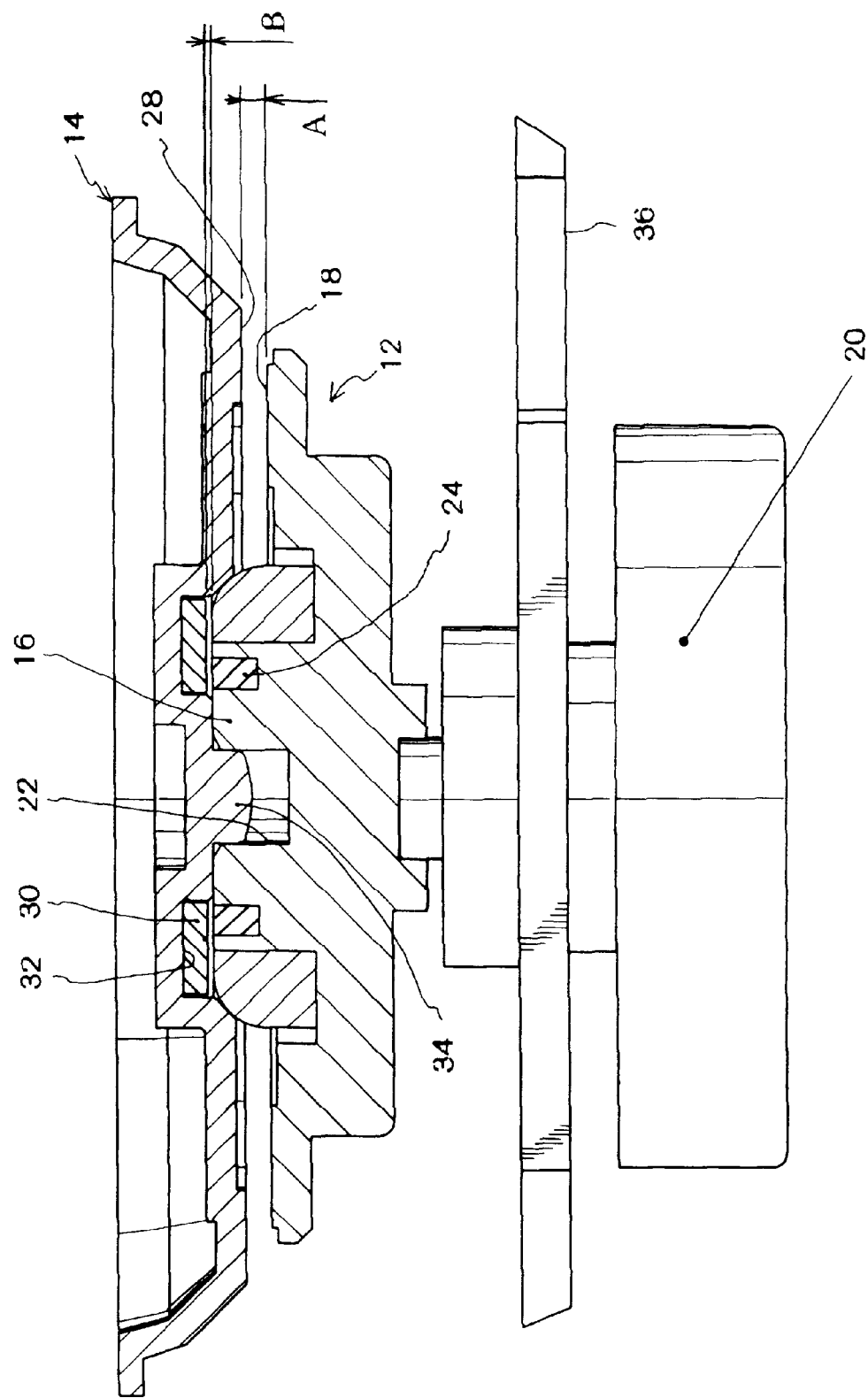
FIG. 5 is a front sectional view of the conventional disk clamping mechanism.

In FIG. 3, the positioning boss 34 is provided at the center of the upper end face of the columnar section 16 of the turntable 12. On the other hand, the circular hole 22 is bored at the center of the bottom face of the clamper 14. When the positioning boss 34 is inserted into the circular hole 22, the axial line of the clamper 14 can be coincided with the axial line of the turntable 12.

The outer circumferential face of the positioning boss 34 is formed into the tapered face 50 whose outer diameter is gradually made greater toward the base end thereof. The tapered face 50 of the positioning boss 34 contacts the inner edge of the circular hole 22 when the clamper 14 is magnetically held on the turntable 12, on which no disk-shaped medium is mounted, and the insertion of the positioning boss 34 into the circular hole 22 is stopped when the distance between the pressing section 28 of the clamper 14 and the supporting section 18 of the turntable 12 is slightly shorter than the thickness of the disk-shaped medium.

In the above described embodiments, the distance between the surface of the ring magnet of the turntable and the surface of the planar ring of the clamper can be properly controlled by adjusting the position, the shape and the angle of the tapered face. Therefore, even if no disk-shaped medium is clamped, the proper clearance can be formed between the clamper and the turntable, so that the clamper can be moved away from the turntable with smaller force. By moving the clmaper with the smaller force, the stress working to the disk clamping mechanism can be reduced, so that damage and trouble of the disk clamping mechanism can be prevented.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description sand all changes which come within the meaning and range of equivalency of the claims are therefore intended to be embraced therein.

What is claimed is:

1. A disk clamping mechanism, comprising:

a turntable being formed into a circular disk, said turntable having a columnar section, which is coaxially provided to a center of an upper face of said turntable and which is capable of fitting into a center hole of a disk-shaped medium mounted on said turntable so as to coincide an axial line of the disk-shaped medium with an axial line of said turntable, and a circular supporting section, which is capable of supporting a bottom face of the disk-shaped medium and which is formed in the upper face and along an outer edge of said turntable;

a clamper being formed into a circular disk, said clamper having a circular pressing section, which is formed in a bottom face and along an outer edge of said clamper, said clamper being magnetically drawn toward the upper face of said turntable so as to hold the disk-shaped medium between the supporting section of said turntable and the pressing section of said clamper;

a circular hole being formed at a center of an upper end face of the columnar section of said turntable; and a positioning boss being formed into a columnar shape and provided to a center of the bottom face of said clamper, said positioning boss being inserted into said circular hole so as to coincide an axial line of said clamper with the axial line of said turntable, wherein an outer circumferential face of said positioning boss is formed into a tapered face whose outer diameter is gradually made greater toward a base end thereof and a maximum outer diameter of the tapered face is greater than an inner diameter of said circular hole, and the tapered face of said positioning boss contacts an inner edge of said circular hole when said clamper is magnetically held on said turntable on which no disk-shaped shaped medium is mounted, and the insertion of said positioning boss into said circular hole is stopped before said positioning boss is completely inserted into said circular hole.

2. The disk clamping mechanism according to claim 1, wherein the tapered face is formed in a base end part of said positioning boss.

3. A disk clamping mechanism, comprising:

a turntable being formed into a circular disk, said turntable having a columnar section, which is coaxially provided to a center of an upper face of said turntable and which is capable of fitting into a center hole of a disk-shaped medium mounted on said turntable so as to coincide an axial line of the disk-shaped medium with an axial line of said turntable, and a circular supporting section, which is capable of supporting a bottom face of the disk-shaped medium and which is formed in the upper face and along an outer edge of said turntable;

a clamper being formed into a circular disk, said clamper having a circular pressing section, which is formed in a bottom face and along an outer edge of said clamper, said clamper being magnetically drawn toward the upper face of said turntable so as to hold the disk-shaped medium between the supporting section of said turntable and the pressing section of said clamper;

a positioning boss being formed into a columnar shape and provided to a center of an upper end face of the columnar section of said turntable; and a circular hole being formed at a center of the bottom face of said clamper, wherein said positioning boss is inserted into said circular hole so as to coincide an axial line of said clamper with the axial line of said turntable, wherein an outer circumferential face of said positioning boss is formed into a tapered face whose outer diameter is gradually made greater toward a base end thereof and a maximum outer diameter of the tapered face is greater than an inner diameter of said circular hole, and the tapered face of said positioning boss contacts an inner edge of said circular hole when said clamper is magnetically held on said turntable on which no disk-shaped medium is mounted, and the insertion of said positioning boss into said circular hole is stopped before said positioning boss is completely inserted into said circular hole.

4. The disk clamping mechanism according to claim 3, wherein the tapered face is formed in a base end part of said positioning boss.

\* \* \* \* \*